United States Patent [19]
Stewart

[11] Patent Number: 5,505,548
[45] Date of Patent: Apr. 9, 1996

[54] BEARING RETAINER

[75] Inventor: Timothy J. Stewart, Akron, Ohio

[73] Assignee: Ametek, Inc., Kent, Ohio

[21] Appl. No.: 528,596

[22] Filed: Sep. 15, 1995

Related U.S. Application Data

[63] Continuation of Ser. No. 58,379, May 10, 1993, abandoned.

[51] Int. Cl.$^6$ .................................................. F16C 43/00
[52] U.S. Cl. .......................... 384/537; 384/204; 384/903
[58] Field of Search ................................ 384/204, 208,
384/295, 296, 428, 438, 439, 537, 539,
561, 585, 903; 310/90; 403/326, 375; 267/161,
163

[56] References Cited

U.S. PATENT DOCUMENTS

| | | | |
|---|---|---|---|
| 1,810,093 | 6/1931 | Timson | 384/903 X |
| 3,966,278 | 6/1976 | Lewis | 384/204 |
| 4,710,037 | 12/1987 | Newberg | 384/585 X |
| 5,055,728 | 10/1991 | Looper et al. | 310/90 X |
| 5,232,341 | 8/1993 | Shier et al. | 384/537 X |
| 5,274,289 | 12/1993 | Wrobel | 310/90 |

FOREIGN PATENT DOCUMENTS 2160935  1/1986  United Kingdom ................... 384/585

Primary Examiner—Thomas R. Hannon
Attorney, Agent, or Firm—Renner, Kenner, Greive, Bobak, Taylor & Weber

[57] ABSTRACT

A bearing retaining device is provided to maintain a shaft bearing within a housing. In one embodiment the device has a housing with a central bore into which is received a bearing. The bearing rests upon a bearing seat and is maintained in the housing by a retainer clip. The retainer clip is generally disc shaped with a number of spring tab members extending at an angle therefrom. When the retainer clip is rotated within the housing, the spring tab members are compressed by brush holders protruding into the housing and above the retainer seat. The spring tab members spring back to position after clearing the protrusions and dimpled ears formed in the retainer clip body frictionally engage the brush holders. The trailing edge of each spring tab member grips the side of each brush holder. The bearing is thereby locked into the housing and displacement and vibration thereof are eliminated.

13 Claims, 2 Drawing Sheets

BEARING RETAINER

This is a continuation of application Ser. No. 08/058,379, filed May 10, 1993, now abandoned.

TECHNICAL FIELD

The invention herein resides in the art of retention devices and, more particularly, to a retaining device for a commutator shaft bearing in a motor housing or other similar shaft and housing arrangement. Specifically, the invention pertains to such a retaining device which is retained by engagement with the commutator brush housing.

BACKGROUND ART

It is well known that the assembly of a motor often requires the placement of component parts thereof into a housing. Typically, the commutator shaft is mounted on a bearing to be received by a housing bore. Previously, it has been known to secure the bearing within the bore by a retaining ring received within a circumferential groove about the bore sidewall, the retaining ring engaging the bearing. In such prior art structures, the retaining ring is placed within the groove after the bearing has been appropriately positioned within the bore. Typically, special pliers are used for placing and/or removing the retaining ring from the groove. In such a prior art structure the retaining ring must be inserted into the bore while compressed and then aligned with the groove in order to be received therein. This alignment is often difficult, as the pliers impair visual alignment and the required compression force tends to twist the ring slightly. Accordingly, the prior art techniques and structures have been labor intensive.

The prior art has been particularly difficult to implement when the motor housing is located in an awkward position or in poorly lighted conditions. Such makes consistently positive locking difficult, frequently allowing for vibration and displacement of the bearing within the bore. By way of example, when the motor is integrated into a machine such that the motor housing is shrouded and positioned vertically within the shroud and access to the motor can only be made through a relatively small access panel, visual alignment of a conventional snap ring within the housing bore is difficult at best, if not impossible. Accordingly, there is a risk that the ring is not fully engaged between the groove and the bearing.

There is clearly a need in the art for a bearing retaining device which is easy to install and which can consistently provide positive locking of the bearing within a housing without the need for visual alignment.

DISCLOSURE OF INVENTION

In light of the foregoing, it is a first aspect of the invention to provide a bearing retaining device for retaining a shaft bearing in a housing bore.

Another aspect of the invention is the provision of a bearing retaining device which positively locks the bearing in the housing.

Yet a further aspect of the invention is the provision of a bearing retaining device which prevents vibration in or displacement from the bearing bore.

Still a further aspect of the invention is the provision of a bearing retainer which is inexpensive to manufacture and simple to use, while being reliable and durable in operation.

The foregoing and other aspects of the invention which will become apparent as the detailed description proceeds, are achieved by the improvement in a commutator housing, comprising: a central bore; a plurality of protrusions extending into said bore; a bearing received within said bore; and retaining means for said bearing, said retaining means being interposed between said bearing and said protrusions to secure locking engagement of said bearing in said bore.

Other aspects of the invention are obtained by a retaining clip, comprising a generally annular disc shaped body member having an inner diameter and an outer diameter, said inner diameter defining a generally circumferential aperture; a plurality of spring members extending generally upwardly and obliquely from said outer diameter, and a plurality of ears also extending from said outer diameter.

BRIEF DESCRIPTION OF DRAWINGS

For a complete understanding of the objects, techniques and structure of the invention reference should be made to the following detailed description and accompanying drawings wherein:

FIG. 3 is a top plan view of the retainer clip according to the invention;

BEST MODE FOR CARRYING OUT THE INVENTION

Figure 2:
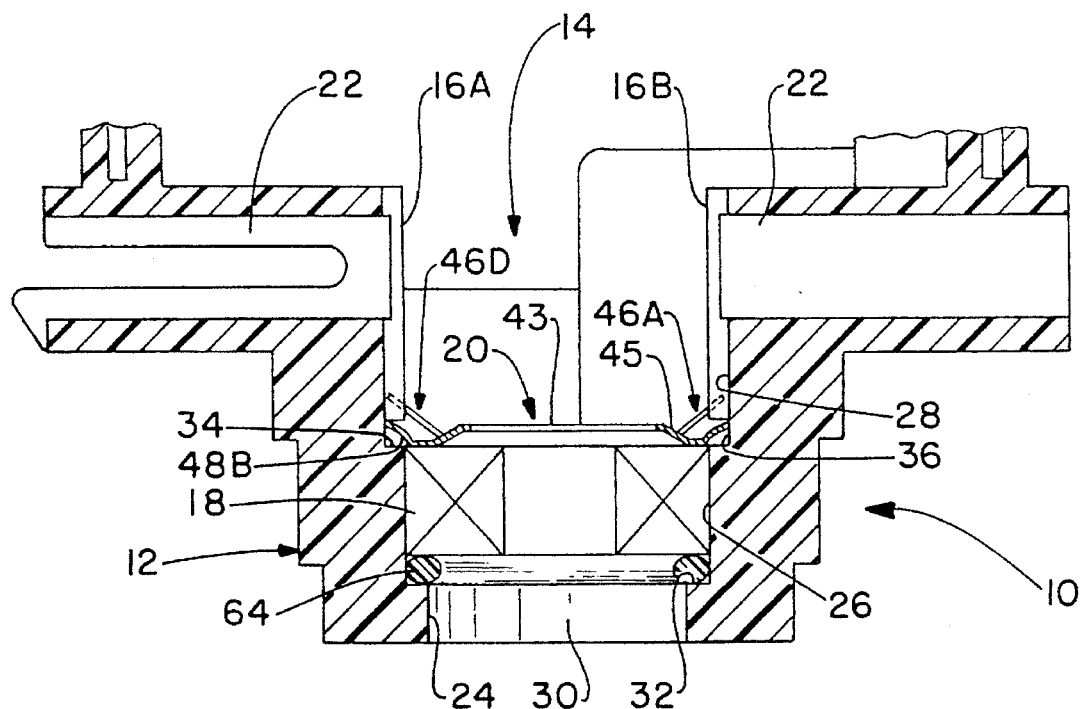
FIG. 2 is a cross sectional view of the assembly of FIG. 1 taken along the line 2—2.

Referring now to the drawings and more particularly to FIG. 2, it can be seen that a retaining device according to the invention is designated generally by the numeral 10. As can be seen, the device 10 is comprised generally of a commutator housing 12, with a central bore 14, a pair of protrusions in the form of diametrically opposed brush holders 16A and 16B, a bearing 18, and a retaining clip 20. In a preferred embodiment of the invention the housing 12 is molded from an appropriate plastic. The diametrically opposed brush holders 16A and 16B are formed with apertures 22 to receive conventional commutator brushes (not shown) to be urged into contact with the commutator (not shown) by spring force.

As can be seen, the central bore 14 of the housing 12 is comprised of three sections having different diameters, such sections being aligned coaxially. These sections may be molded as part of the housing 14 or be machined into the housing 14 after molding. As shown, the first section 24 has the smallest diameter of the three and defines a commutator shaft aperture 30. The second section 26 has a diameter larger than that of the first section 24, which diameter is substantially equal to that of the bearing 18. As depicted, the section 26 does not fully penetrate the housing 12 such that a bearing seat 32 is formed therein. The third section 28 has a diameter which is slightly larger than that of the second section 26 and is of a size to permit the free rotation of a commutator therein. As shown, the third section 28 penetrates the housing 12 to a location above the bearing seat 32 approximating the thickness of the bearing 18. This partial penetration of the housing 12 forms a retainer seat 34. As can be seen, the section 28 is interrupted by the diametrically opposed brush holders 16A and 16B which protrude into the central bore 14 and are concentric with the second diameter 26. As shown, a groove 36 is present between the retainer seat 34 and the protruding brush holders 16A and 16B such that the circumferential retainer seat 34 is uninterrupted about the central bore 14.

Figure 4:
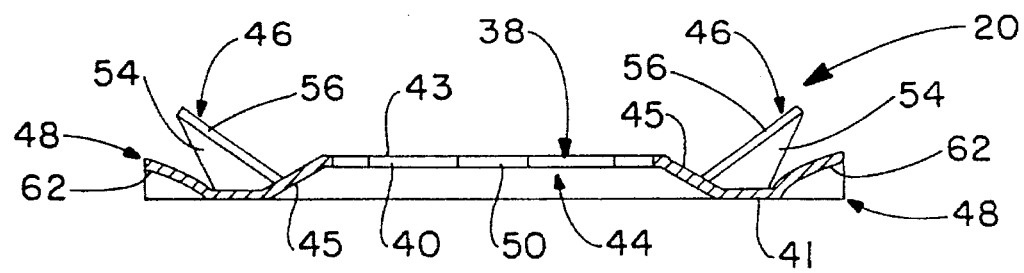
FIG. 4 is a cross sectional view of the retainer clip of FIG. 3 taken along the line 4—4.
Figure 5:
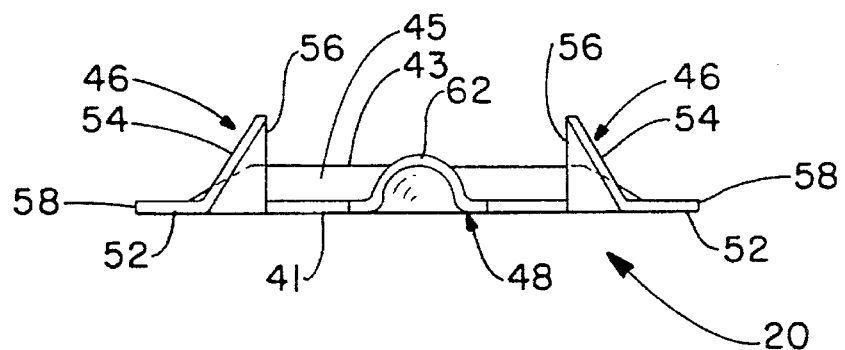
FIG. 5 is a side view of the retainer clip.

In the preferred embodiment, the retaining clip 20 is stamped from a single piece of an appropriate metal such as 1050 spring steel. As shown in FIGS. 3–5 the retaining clip 20 is comprised of an annular disc shaped body member 38 having an outer edge 42 and substantially parallel first and second planar portions 41, 43. The second portion 43 is supported by a circumferential third portion 45 extending upwardly and obliquely from the first portion 41. An inner edge 40 defines a generally circular aperture 44 in the second portion 43.

The retaining clip 20 further comprises a plurality of spring tab members 46A, 46B, 46C and 46D and a plurality of ears 48A and 48B which extend from the disc shaped body member 38. As can be seen, the aperture 44 is further characterized by a plurality (preferably four) of semicircular scallops 50 in the inner edge 40 which are capable of receiving a mating tool for installation of the retainer 20 in the housing 12. In the preferred embodiment, the scallops 50 are uniformly circumferentially spaced about the inner edge 40 of the aperture 44. As should be apparent to those skilled in the art, means other than scallops could be employed for tool engagement while satisfying the purposes of the invention.

The spring tab members 46 which are formed by an appropriate staking process or the like are comprised of a first leg 52 and a second leg 54. As shown, the first leg 52 extends outwardly from the outer edge 42, while the second leg 54 extends upwardly and obliquely from the first leg 52. In the preferred embodiment the center of each spring tab member 46 is located 45°–60° and preferably 52° from axis A with spring tab members 46A and 46C being diametrically opposed from one another and spring tab members 46B and 46D also being diametrically opposed from one another. As shown, the trailing edge 56 of the second leg 54 terminates on a line substantially parallel to a central axis B which is orthogonal to the axis A. As can be seen the outer periphery 58 of the spring tab member 46 is on a radius approximating that of the central bore 14 of the housing 12.

As shown in the preferred embodiment, a pair of ears 48A and 48B extend radially from the outer diameter 42 and are diametrically opposed to one another with ear 48A being located between spring tab members 46A and 46B and ear 48B between spring tab members 46C and 46D. As can be seen the outer periphery 60 of the ears 48A and 48B is circumferentially aligned with the spring tab members 46. As shown, a U-shaped dimple 62 is formed on each ear 48A and 48B for reasons which will become apparent as the description continues.

Figure 1:
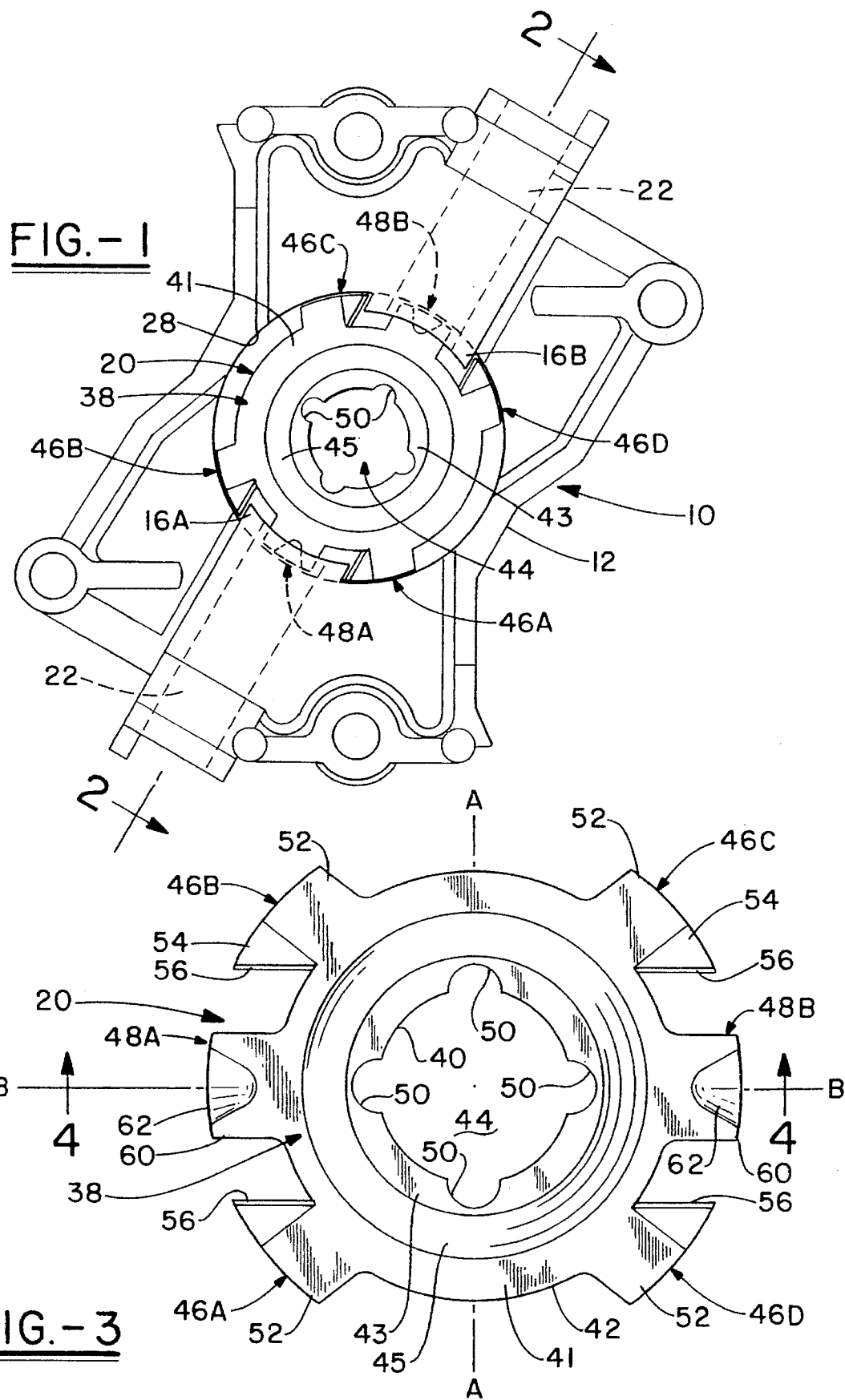
FIG. 1 is a top plan view of a complete commutator housing and bearing assembly according to the invention.

With reference again to FIGS. 1 and 2, assembly of the device according to a preferred embodiment is accomplished by first inserting a neoprene washer 64 into the housing bore 14 such that it rests upon the bearing seat 32. Next the bearing 18, which may be a ball bearing assembly, is placed in position on the neoprene washer 64. Alternatively, a self aligning sleeve bearing may be used, in which case the neoprene washer 64 would not be necessary. Finally, the retaining clip 20 is inserted into the bore 14 so that the spring tab members 46 extend away from the bearing 18. A tool is then used to engage the scallops 50 of the inner diameter 40 so that the retaining clip 20 may be rotated into locking engagement with the housing 12.

The raised structure formed by second portion 43 and third portion 45 serves a dual purpose. First the structure by its nature adds strength and rigidity to the overall retainer 20. Second, the structure provides clearance above the bearing, allowing the mating tool to penetrate the aperture to a depth sufficient to insure positive engagement. As shown, this locking engagement is accomplished upon rotation in either a clockwise or counterclockwise direction as a pair of diametrically opposed spring tab members 46 are forced into the groove 36 and deflected by the associated brush holder 16. As rotation is completed the spring tab member 46 clears the associated brush holder 16 and springs back into its original form. Simultaneously, the ears 48 are interposed in the groove 36 under the brush holders 16 and the dimples 62 come into frictional engagement with the brush holders 16. Further, the trailing edges 56 of the opposing spring tab members come into contact with the respective brush holders 16A and 16B, thereby preventing any further rotation of the retaining clip.

As should now be apparent, the retaining clip 20 is thereby held in locking engagement with the commutator housing 12 by simply seating the retaining clip 20 and rotating it in either a clockwise or counterclockwise direction. The opposed trailing edges 56 of the second legs 54 of the spring tab members 46 grippingly engage the sides of the protruding brush holders 16 preventing rotation of the clip 20 in either direction. Further, the dimpled ears 48 are interposed in the groove 36 between the protruding brush holders 16 and the retainer seat 34. This precludes any axial movement by the bearing and along with the frictional engagement of the spring tab members 46 further precludes any vibration of the bearing 18 within the bore and otherwise accomplishes the objects of the invention.

Thus it can be seen that the objects of the invention have been satisfied by the structure presented above. While in accordance with the patent statutes only the best mode and preferred embodiment of the invention has been presented and described in detail, it is to be understood that the invention is not limited thereto or thereby. Accordingly, for an appreciation of the true scope and breadth of the invention, reference should be made to the following claims.

What is claimed is:

1. In a shaft housing, the improvement comprising:

a central bore;

a plurality of protrusions extending into said bore;

a bearing received within said bore; and a retaining clip for said bearing, said retaining clip comprising an annular disc shaped body member, an aperture in said body member, a plurality of spring members extending upwardly and obliquely from said body member, and a plurality of ears also extending from said body member:

said retaining clip being interposed between said bearing and said protrusions for securing locking engagement of said bearing within said bore.

2. The improvement in a shaft housing as recited in claim 1, wherein said aperture of said retaining clip is further defined by a plurality of semicircular scallops.

3. The improvement in a shaft housing as recited in claim 1, wherein each said spring member of said retaining clip comprises a first leg, said first leg extending outwardly from said disc shaped body member, and a second leg, said second leg extending upwardly and obliquely from said first leg.

4. The improvement in a shaft housing as recited in claim 3 wherein said second leg of said spring member has a trailing edge.

5. The improvement in a shaft housing as recited in claim 1, wherein said ears of said retaining clip extend radially from said disc shaped body member and are diametrically opposed from one another and have a dimple formed therein.

6. The improvement in a shaft housing as recited in claim 5, wherein said retaining clip is rotatable to engage said protrusions, said spring members are adapted to frictionally engage the sides of said protrusions and said ears have dimples adapted to frictionally engage a bottom of said protrusions whereby said bearing is prevented from moving both axially and radially.

7. The improvement in a shaft housing as recited in claim 1, wherein said protrusions are diametrically opposed brush holders.

8. The improvement in a shaft housing as recited in claim 1, wherein said central bore is comprised of sections having a first diameter, a second diameter and a third diameter, such sections being coaxial.

9. The improvement in a shaft housing as recited in claim 8, wherein said section of said first diameter defines an aperture.

10. The improvement in a shaft housing as recited in claim 8, wherein said second diameter is larger than an outer diameter of said bearing.

11. The improvement in a shaft housing as recited in claim 8, wherein said third diameter is larger than said second diameter and said section of said third diameter defines a seat thereon for said retaining clip.

12. The improvement in a shaft housing as recited in claim 11, wherein said seat passes under said protrusions forming a groove therebetween.

13. The improvement in a shaft housing as recited in claim 8, wherein said protrusions extend into said bore from said section of said third diameter and are concentric with said section of said second diameter.

* * * * *